US012663024B2

(12) United States Patent
Marchetti

(10) Patent No.: US 12,663,024 B2
(45) Date of Patent: Jun. 23, 2026

(54) CONTROL DEVICE OF A PNEUMATIC ELEMENT

(71) Applicant: Gimatic S.r.l., Roncadelle (IT)

(72) Inventor: Luciano Marchetti, Roncadelle (IT)

(73) Assignee: GIMATIC S.R.L., Roncadelle (IT)

( * ) Notice: Subject to any disclaimer, the term of this patent is extended or adjusted under 35 U.S.C. 154(b) by 0 days.

(21) Appl. No.: 19/184,651

(22) Filed: Apr. 21, 2025

(65) Prior Publication Data

US 2025/0361885 A1 Nov. 27, 2025

(30) Foreign Application Priority Data

May 23, 2024 (IT) ......................... 102024000011698

(51) Int. Cl.
F15B 11/08 (2006.01)
B65G 47/91 (2006.01)
(Continued)

(52) U.S. Cl.
CPC ............ F15B 11/08 (2013.01); B65G 47/917 (2013.01); F15B 11/064 (2013.01); (Continued)

(58) Field of Classification Search
CPC ...... F15B 11/08; F15B 11/064; F15B 20/002; F15B 2211/3138; F15B 2211/329; F15B 2211/411; F15B 2211/428; F15B 2211/862; F15B 2211/88; F15B 2211/8855; F15B 2211/89; B65G 47/917
See application file for complete search history.

(56) References Cited

U.S. PATENT DOCUMENTS 5,277,468 A * 1/1994 Blatt ......................... F04F 5/52
                                                        417/187
6,003,428 A 12/1999 Mundie et al.
(Continued)

FOREIGN PATENT DOCUMENTS

DE 102016204122 A1 9/2017
DE 102018214101 A1 2/2020
(Continued)

OTHER PUBLICATIONS

Italian Search Report for Italian Application No. 102024000011698; Report Mail Date Dec. 11, 2024 (10 Pages).

*Primary Examiner* — Dustin T Nguyen
(74) *Attorney, Agent, or Firm* — CANTOR COLBURN LLP

(57) ABSTRACT

A control device of a pneumatic element includes a supply circuit supplying compressed air to an inlet of the pneumatic element. The control device includes a normally closed monostable valve having an inlet connected to a compressed air source and an outlet connected to the inlet of the pneumatic element. A bistable valve has an inlet connected to the compressed air source and an outlet connected to a first control port of the normally closed monostable valve. A normally open monostable valve has a first inlet connected to the compressed air source and an outlet connected to a second control port of the normally closed monostable valve. The first and second control ports controls the opening and closing of the normally closed monostable valve. The valves are operable control the flow of compressed air.

21 Claims, 8 Drawing Sheets

(51) Int. Cl.
    *F15B 11/064*        (2006.01)
    *F15B 20/00*        (2006.01)

(52) U.S. Cl.
    CPC ..... *F15B 20/002* (2013.01); *F15B 2211/3138*
        (2013.01); *F15B 2211/329* (2013.01); *F15B*
    *2211/411* (2013.01); *F15B 2211/428* (2013.01);
        *F15B 2211/862* (2013.01); *F15B 2211/88*
    (2013.01); *F15B 2211/8855* (2013.01); *F15B*
        *2211/89* (2013.01)

(56)             References Cited

U.S. PATENT DOCUMENTS

| | | | | |
|---|---|---|---|---|
| 6,397,876 B1 * | 6/2002 | Golden | .................. | F04F 5/52 |
| | | | | 417/187 |
| 6,443,175 B1 * | 9/2002 | Pabst | .................. | F04F 5/52 |
| | | | | 137/12 |
| 6,719,536 B2 * | 4/2004 | Schmalz | .................. | F04F 5/52 |
| | | | | 417/189 |
| 6,786,228 B2 * | 9/2004 | Pabst | .................. | F04F 5/52 |
| | | | | 417/187 |
| 11,325,267 B2 | 5/2022 | Söderman et al. | | |
| 12,134,528 B2 * | 11/2024 | Buffat | .................. | F04B 37/10 |

FOREIGN PATENT DOCUMENTS

| | | | |
|---|---|---|---|
| EP | 1719720 A1 | 11/2006 | |
| WO | 2020079004 A1 | 4/2020 | |

* cited by examiner

CONTROL DEVICE OF A PNEUMATIC ELEMENT

CROSS-REFERENCE TO RELATED APPLICATIONS

This application claims priority to Italian Patent Application No. 102024000011698, filed May 23, 2024, the contents of which are incorporated by reference herein in their entirety.

Field of the Invention

The present invention relates to a control device (also called a regulator) of a pneumatic element in the field of industrial manipulators, in particular manipulators that move objects by exploiting vacuum or depressurization of a gripping element.

State of the Art

In the field of industrial automation, the use of manipulators equipped with pneumatic gripping elements that retain objects to be handled by exploiting the vacuum generated by centralized pumps, or Venturi nozzles or ejectors, is well known. The gripping elements constitute the end part of the manipulator, and for this reason they fall into the category of products identified by the acronym EOAT, end-of-arm tooling.

Conventionally, the gripping elements are suction cups or pads equipped with spongy inserts (foam grippers) directly coupled to the manipulator or constrained to suspensions functionally interposed between the gripping elements and the manipulator to compensate for any differences in the height of the surfaces of the objects to be handled, or variations in the manipulator travel, etc.

In many applications, ejectors are used to generate and maintain vacuum, that is, the low pressure required for gripping elements to operate properly, especially to handle objects which are difficult to pick up or fragile. In summary, an ejector comprises a duct equipped with a Venturi-type nozzle having:

an inlet hole for connecting to an external compressed air circuit;

an outlet hole for an air jet accelerated by the nozzle, and a suction hole arranged between the inlet hole and the outlet hole, through which air drawn by the air flow, which is moving between the inlet hole and the outlet hole, is sucked.

The suction hole is fluidically connected to at least one gripping element of the manipulator, such as a suction cup, so that, when the ejector is in use, an air flow is drawn from the gripping element while it is resting against the surface of the object to be picked up, thus generating a low pressure at the volume delimited by the gripping element and the object, so that the object can be lifted.

A valve is placed along the compressed air circuit; the valve can take three states, positions or configurations:

a first state, corresponding to the open valve, which allows air to flow into the circuit and, thus, allows the low pressure state (vacuum) to be created in the gripping element and the object to be gripped by the manipulator, a second state, corresponding to the closed valve, which does not allow compressed air to pass through the circuit but retains compressed air in the circuit while preventing it from being discharged into the atmosphere, ideally maintaining the low pressure state of the circuit, and a third state, corresponding to the valve that not only is closed but also discharges the compressed air into the atmosphere and therefore empties the compressed air circuit, thus canceling the low pressure state, so that the object is released by the manipulator.

In addition, it is known to install along the compressed air circuit an automatic regulator, basically an electronic device to control the valve, having the function of automatically adjusting the low pressure that is instantaneously generated by the ejector, in order to prevent compressed air from being wasted and, therefore, minimize energy consumption (energy saving function). A first adjustment by the automatic regulator consists in cutting off the supply of compressed air to the ejector when the low pressure in the suction element has reached a predetermined threshold value, but without discharging compressed air into the atmosphere through the valve, and thus bringing the valve into the second state, precisely in order to avoid waste. When low pressure diminishes below a predetermined threshold value (increase in pressure in the circuit), for example due to ambient air entering at the gripping element, the supply of compressed air to the ejector is restored, i.e., the automatic regulator returns the valve to its first state (open). The object is released voluntarily by bringing the valve into the third state.

Automatic regulators usually comprise an electronic control circuit programmed to selectively change the state of the valve and maintain it in one of the three states described above, for as long as it is necessary to retain the object on the manipulator until the object has to be released.

Conventionally, for reasons of cost and simplicity, the valve controlled by automatic regulators is a monostable valve of the normally closed type, so that in the event of an electrical blackout or failure of power supply to the valve, the monostable valve remains in the second state, that is, it does not release compressed air into the atmosphere and the object is not released from the manipulator at an unintended location. However, in the event that, in addition to the electrical black-out, there is also a pressure increase in the compressed air circuit downstream of the valve, that is, in the event that the low pressure is relieved due to ambient air flowing into the circuit between the valve and the gripping element, this solution is not capable of preventing the object from being accidentally released. In this circumstance, indeed, the pressure in the gripping element increases to the point of causing the previously picked-up object to detach and fall off.

Solutions in which there is no safeguard/safety against power failure are described in U.S. Pat. No. 6,003,428 (SMC Pneumatics) and EP 1719720 (Schmalz).

To overcome this drawback, it has been proposed to use a capacitor or a buffer battery that allows the valve to be returned to its first state (open valve) by the automatic regulator when a power failure occurs. However, this solution involves higher costs and more complex management of the automatic regulators.

A solution provided with both the energy saving function and safeguard/security against power failures is described in EP3867024, in the name of Coval. This document describes a solution in which the adjustment is based on the use of more than one valve along the compressed air circuit:

a normally closed monostable valve V, having an inlet for connecting to a compressed air source and an outlet for connecting to the gripping element, and a bistable directional-control valve D1, having a first port connected to the compressed air source and a second port connected to a first port of a normally open monostable directional-control valve D2. The normally open monostable directional-control valve D2 has a second port connected to a pneumatic control port of the normally closed monostable valve V.

The bistable directional-control valve D1 can take a configuration to allow air to pass through, in which a connection is made between the first port and the second port of the same bistable directional-control valve D1, and a configuration to stop air from passing through, in which the first port and the second port are disconnected.

The normally open monostable directional-control valve D2 can take an at rest configuration in which a connection is made between the first port and the second port of the same normally open monostable directional-control valve D2, and a discharging configuration in which the second port of the normally open monostable directional-control valve D2 is connected to an air discharge outlet (into the environment).

The two valves D1 and D2 are solenoid valves arranged in series upstream of the normally closed monostable valve V, and this requires a compressed air supply circuit to be long enough to accommodate the very two valves D1 and D2 in series; the responsiveness of the regulator is limited by a long circuit and two solenoid valves in series.

The regulator comprises a first control unit UC1 configured to control the state of the bistable directional-control valve D1, and comprises a second control unit UC2 configured to bring the normally open monostable directional-control valve D2 into the configuration of discharging air into the surrounding environment. In the event that pressurization of the circuit occurs, i.e., the low pressure state at the gripping element is relieved beyond a predetermined threshold value, the second control unit UC2 brings the normally open monostable directional-control valve D2 from the discharging configuration into the at rest configuration, thus causing the normally closed monostable valve V to switch from the closed state to the open state, therefore providing low pressure in the gripping element again, in order to limit the risks of uncontrolled release of the picked-up object. In the event of black-out or electrical malfunction, the normally open monostable directional-control valve D2 switches from the discharging configuration to the at rest configuration, thereby restoring the low pressure state to limit the risks of uncontrolled release of the picked-up object. In the event of failure of the power supply of the second control unit UC2 or malfunction of the normally open monostable directional-control valve D2, the system adopts a safeguard mode, in which compressed air is continuously supplied to the ejector, i.e., the low pressure is constantly maintained in the gripping element to prevent the object from being released and falling.

DE102016204122 (Festo) and U.S. Pat. No. 11,325,267 (Piab) describe other known solutions in the field.

SUMMARY OF THE INVENTION

Object of the present invention is to provide a control device, also called a regulator, to control a pneumatic element, such as gripping elements operating under low pressure, or ejectors, the control device should be alternative to solutions of the known art, while maintaining both the energy-saving function and the safeguards against electrical black-outs or unwanted pressurization of the pneumatic element and, preferably, being more responsive than known solutions.

Therefore, the present invention relates to a control device according to claim 1.

Specifically, the present invention relates to a control device that comprises a supply circuit of compressed air for connecting to an inlet of the pneumatic element. At least the following three valves are provided in the circuit:

a normally closed monostable valve having an inlet for connecting to an outer compressed air source and an outlet for connecting to the inlet of the pneumatic element, and having a first control port and a second control port, a bistable valve having an inlet connected to the source of compressed air and an outlet connected to the first control port of the normally closed monostable valve, where the first control port is configured to control the closing of the normally closed monostable valve, and a normally open monostable valve having a first inlet connected to the compressed air source and an outlet connected to the second control port of the normally closed monostable valve, where the second control port is configured to control the opening of the normally closed monostable valve.

The bistable valve is able of taking:

an open configuration to allow compressed-air to pass through, in which a connection is made between the inlet and outlet of the same bistable valve, and a closed configuration to stop compressed air from passing through, in which the inlet and outlet of the same bistable valve are disconnected and the outlet is connected to an atmosphere vent.

The normally open monostable valve is able of taking:

an open configuration, in which a connection is made between the inlet and outlet of the same normally open monostable valve, and a closed configuration, in which the inlet and outlet of the same normally open monostable valve are disconnected and the outlet is connected to an atmosphere vent.

The solution just described has both the function of energy saving and safeguard/safety against power failures, in order to prevent unwanted deactivation of the pneumatic element or unintentional release of a previously gripped workpiece. Compared with known solutions, such as the one described in EP3867024 involving the use of two solenoid valves D1, D2 arranged in series in the compressed air supply circuit between the compressed air source and the normally closed monostable valve, the control device according to the present invention can be made with valves arranged in parallel in the circuit. This allows a relatively short power supply circuit to be adopted, resulting in maximizing the responsiveness of the control device.

Therefore, the proposed solution not only overcomes the technical problem but also improves on the state of the art.

The control device can be set out in two variants: a first embodiment described above, and a second embodiment that differs from the first one in that the bistable valve comprises a first control port and a second control port, and two additional valves are inserted into the compressed air supply circuit:

a first monostable valve, functionally interposed between the compressed air source and the first control port of the bistable valve, and a second monostable valve, functionally interposed between the compressed air source and the second control port of the bistable valve. The first monostable valve and the second monostable valve are selectively operable to pneumatically control the opening and closing of the bistable valve.

Additional technical characteristics of both variants of the control device are provided in the dependent claims.

The control device can take a first activation configuration to activate the pneumatic element, or to grip the workpiece, in which the pressure of the air supplied by the control device at the inlet of the pneumatic element is equal to the air pressure at the compressed air source. In this configuration the pneumatic element is active. In the suction cup example, the suction cup is depressurized and is gripping a workpiece to be picked up. In case of electrical black-out, the device keeps the normally closed monostable valve open, to keep the pneumatic element active.

In a second configuration, that is energy-saving, in order not to waste compressed air, the control device stops the supply to the pneumatic element, which remains active as long as the air pressure in the pneumatic element does not exceed a threshold value. If the device detects that this circumstance occurs, or is about to occur, it immediately and automatically returns to the first configuration. In the event of electrical black-out, the normally closed monostable valve is immediately reopened by the device, which returns to its initial configuration to keep the pneumatic element active.

In a third and fourth configuration, the pneumatic element is deliberately deactivated, for example to release the workpiece that was previously being manipulated. In the event of an electrical black-out, the device does not act on the valves, since the pneumatic element has already been voluntarily deactivated.

Preferably, the control device is automatic, having an electronic, programmed control unit that selectively controls all the valves to bring the device, exactly in automatic way, from one configuration into another among those described above. More preferably, the control unit processes the signal from one or more pressure sensors located in the compressed air supply circuit, or in the pneumatic element, and feedback controls the valves based on this processing.

BRIEF LIST OF THE FIGURES

Further characteristics and advantages of the invention will be more evident from the review of the following detailed description of its preferred, although not exclusive, embodiments depicted for illustration purposes only and without limitation, with the aid of the attached drawings, wherein.

DETAILED DESCRIPTION OF THE INVENTION

Figure 1:
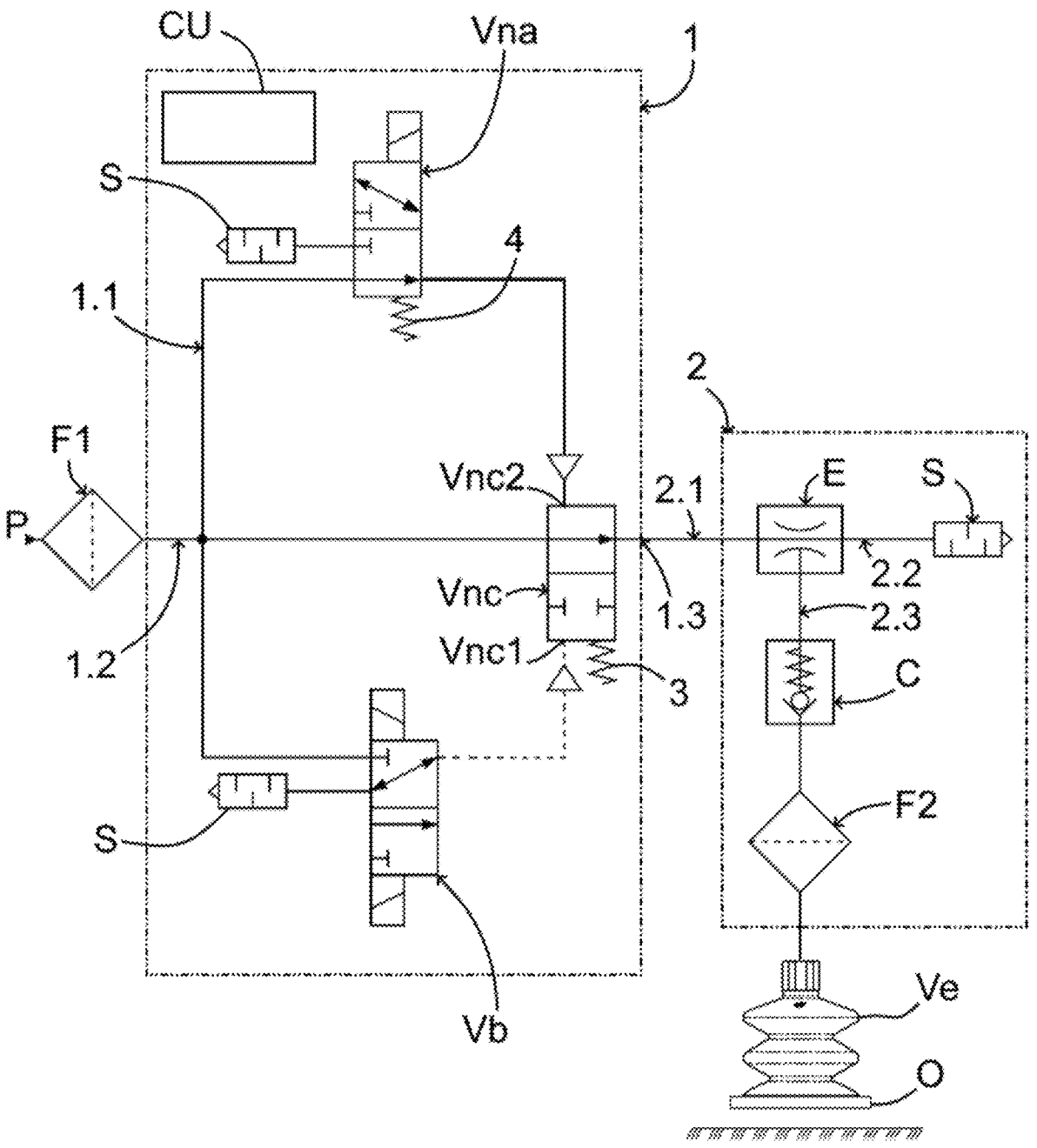
FIGS. 1-4 are schematic views of a first embodiment of a control device according to the present invention, adapted to control a pneumatic element and shown in corresponding configurations of use.

FIGS. 1-4 are construction diagrams of a first embodiment 1 of a control device according to the present invention, configured to control a pneumatic element Ve, such as the suction cup visible in the figures, or an ejector, or a subordinate pneumatic circuit, for example to allow an object/workpiece O to be picked up, moved or released. The pneumatic element Ve can be combined with a corresponding compressed air supply circuit 2 functionally interposed between the control device 1 and the pneumatic element Ve.

In the examples shown, the circuit 2 comprises a compressed air duct 2.1 connected to an outlet of the control device 1, and an ejector E which is on the duct 2.1 and equipped with a Venturi-type nozzle. The ejector E, which can be of conventional type, is in turn connected at 2.2 to a preferably silenced nozzle S for venting to atmosphere and to a suction hole/orifice connected to the pneumatic element Ve by a duct 2.3, so that compressed air passing through the ejector, from the duct 2.1 to the duct 2.2, causes air to be sucked through the pneumatic element Ve and along the duct 2.3. This allows the pneumatic element Ve to be depressurized when it is in abutment against the object O, allowing it to be lifted. For this reason, the pneumatic element Ve can be deformable.

Preferably, there is a calibrated check valve C along the duct 2.3, which has the task of preventing air from flowing in the opposite direction to the desired direction, i.e., preventing air from flowing from the ejector E to the pneumatic element Ve: this prevents or limits unwanted pressurization of the pneumatic element Ve. A filter F2 is placed along the duct 2.3, between the check valve C and the pneumatic element Ve, to filter the air sucked along the duct 2.3 and prevent malfunction of the ejector E caused by dust and impurities which can be otherwise sucked in.

The control device 1, also called regulator 1, has an inlet 1.2 connected to a source P of compressed air, such as a compressed air circuit of the type normally available at industrial sites. A filter F1 intercepts the incoming flow of compressed air from the source P, before it enters the control device 1, to prevent dust and impurities from entering the control device 1.

The control device 1 has an outlet 1.3 connected to the duct 2.1 of the circuit 2 to supply the ejector E, or, in applications in which the circuit 2 is not required, the outlet 1.3 is directly connected to the pneumatic element Ve.

In its first embodiment, the control device 1 comprises an inner compressed air supply circuit 1.1, which runs between the inlet 1.2 and the outlet 1.3.

In the circuit 1.1, a normally closed monostable valve Vnc is installed, the latter having a first operational inlet connected to the inlet 1.2 of the circuit 1.1 and, therefore, connected to the source P of compressed air, and having an operational outlet connected to the outlet 1.3 of the circuit 1.1, which in turn is connected to the circuit 2 or directly to the pneumatic element Ve. The source P supplies compressed air at a pressure higher than atmospheric pressure.

Figure 2:
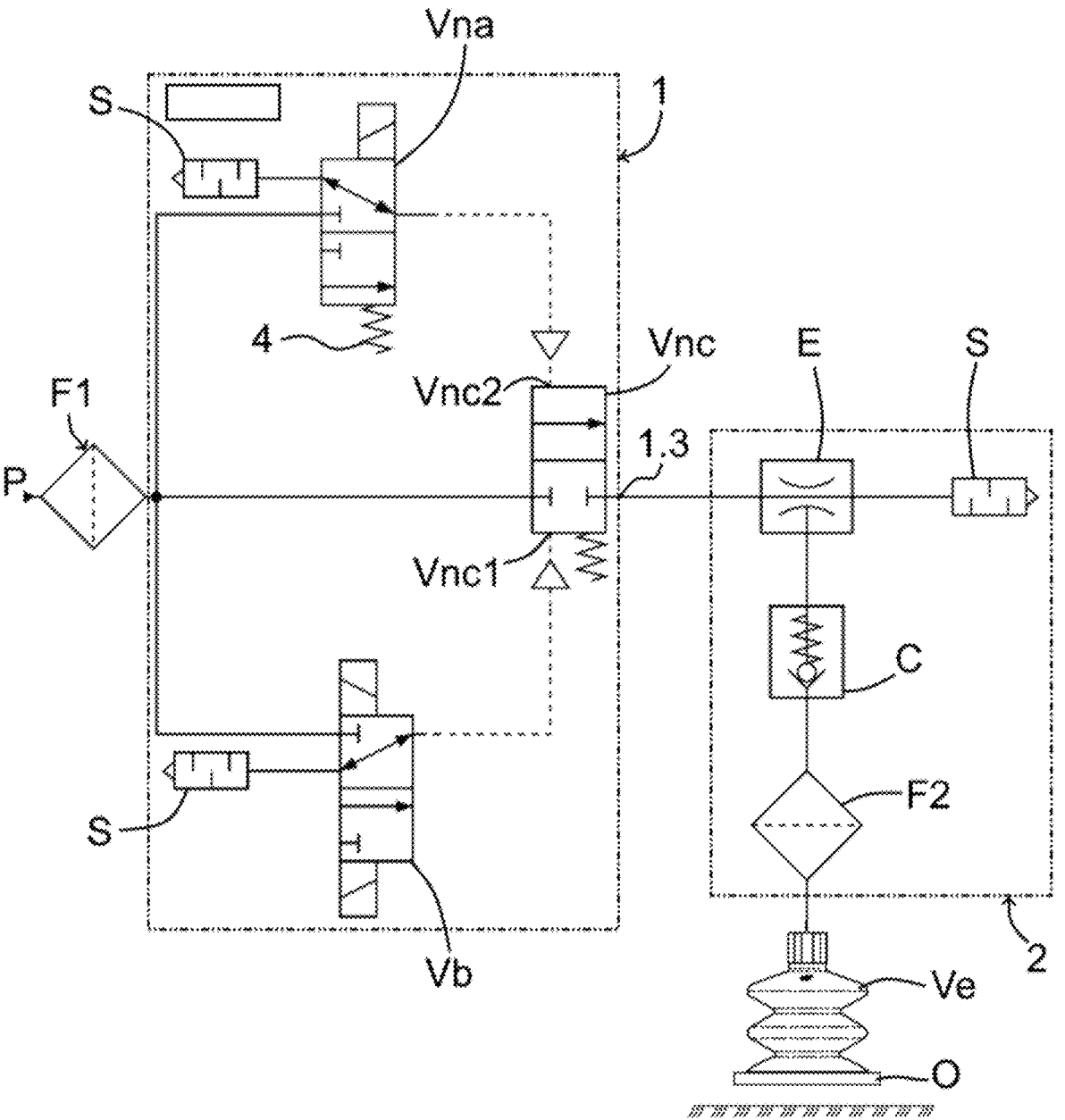
Figure 3:
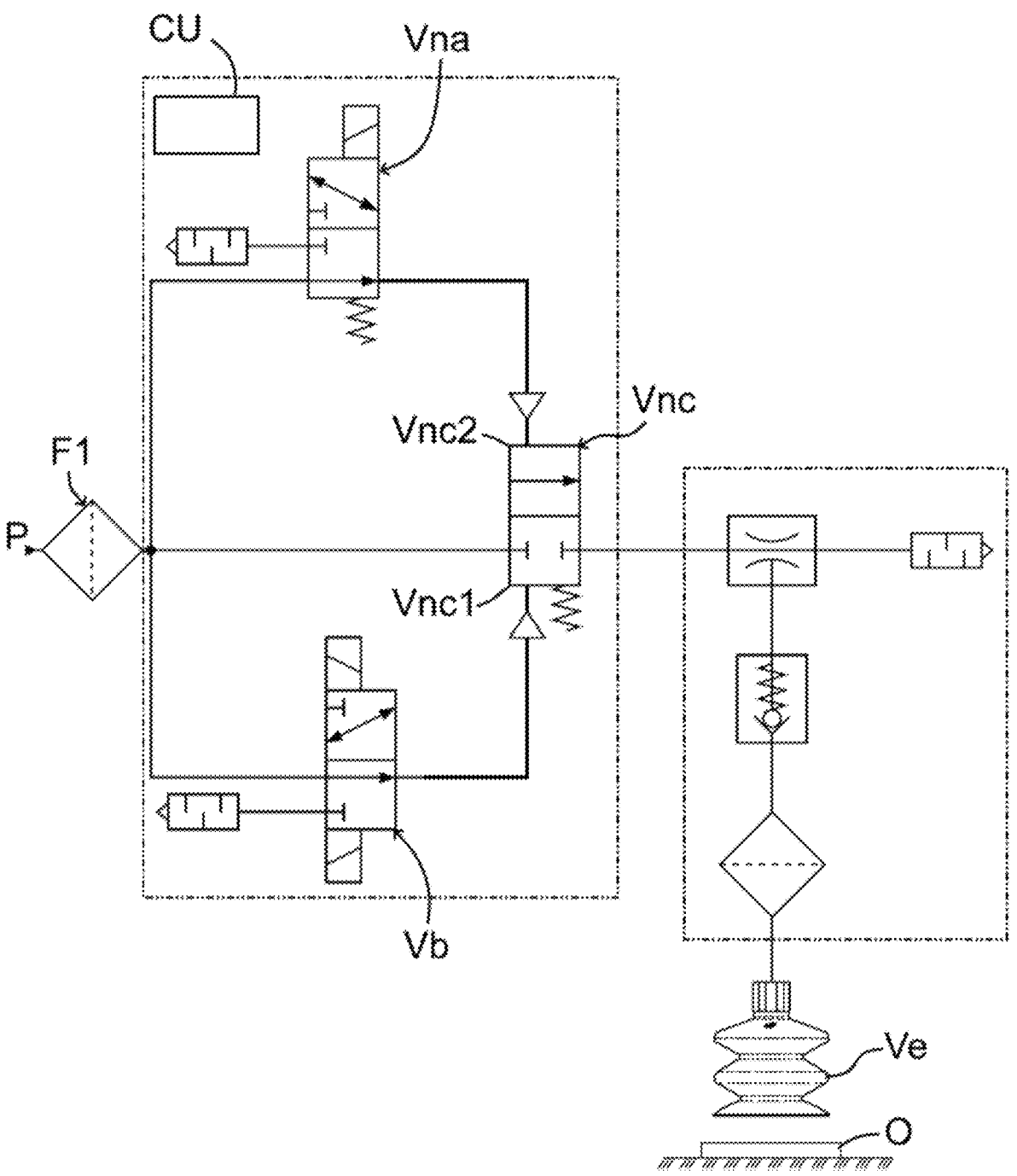
Figure 4:
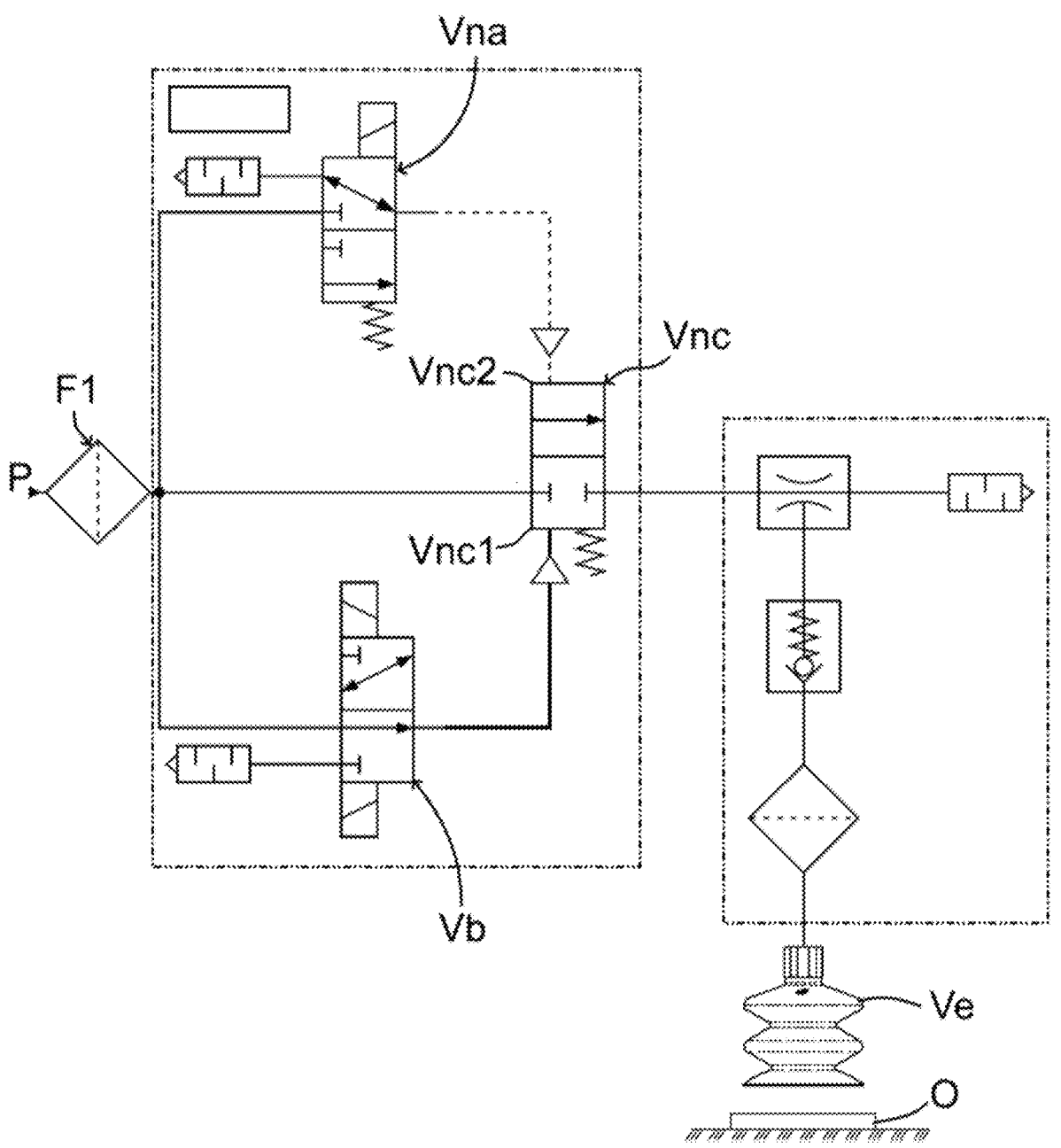

The monostable normally closed valve Vnc can take two operational configurations: a first configuration to allow air to pass through, called open valve, shown in FIG. 1, in which the flow of compressed air from the inlet 1.2 to the outlet 1.3 is allowed, and a second configuration to stop air from passing through, called closed valve, shown in FIGS. 2-4, in which the flow of compressed air to the outlet 1.3 is not allowed. The closed valve configuration is the at rest configuration; the open valve configuration is the energized/powered valve configuration. When the valve Vnc is open, its inlet and outlet are pneumatically connected, and vice versa, when the Vnc valve is closed, its inlet and outlet are pneumatically disconnected.

The normally closed monostable valve Vnc further comprises two (pneumatic) control ports, a first control port Vnc1 and a second control port Vnc2. The term port is used herein to refer to compressed air inlets which are configured to control the position of the valve.

Preferably, as shown schematically in the figures, the normally closed monostable valve Vnc comprises a spring element 3, such as a spring, configured to constantly exert a thrust on the movable components of the valve Vnc to bring the valve into the second configuration, that is, to close and keep the valve Vnc closed. In this condition, in order to open the valve Vnc it is necessary to overcome the force exerted by the spring 3.

Preferably, the normally closed monostable valve Vnc is a one-way valve, although a two-way valve can also be used.

The normally closed monostable valve Vnc is a pneumatic valve, meaning that the first configuration of open valve is switched to the second configuration of closed valve by exploiting the action of compressed air selectively supplied to the control ports Vnc1 and Vnc2, as will be explained in more detail below.

In the circuit 1.1 are additionally installed:

a bistable valve Vb receiving compressed air from the source P through an inlet, and having an outlet connected to the first control port Vnc1 of the normally closed monostable valve Vnc, and a normally open monostable directional-control valve Vna, receiving compressed air from the source P through an inlet, and having an outlet connected to the second control port Vnc2 of the normally closed monostable valve Vnc.

Thus, the bistable valve Vb comprises an inlet connected to the source P and an outlet connected to the first control port Vnc1 of the valve Vnc, and can take two operational configurations: a first configuration to stop air from passing through, called closed valve, shown in FIGS. 1 and 2, in which the flow of compressed air from the inlet 1.2 to the first control port Vnc1 of the normally closed monostable valve Vnc is not allowed, and a second configuration to allow air to pass through, called open valve, shown in FIGS. 3-4, in which the flow of compressed air to the first control port Vnc1 of the normally closed monostable valve Vnc is allowed. When the valve Vb is open, its inlet and outlet are pneumatically connected, and vice versa, when the Vb valve is closed, its inlet and outlet are pneumatically disconnected.

Preferably, the bistable valve Vb is a one-way valve, but it can also be a two-way valve. The bistable valve Vb can be pneumatic, i.e., able to be driven by compressed air, but preferably it is an electrically-driven solenoid valve subjected to an electronic control unit of the programmable type, as will be explained below. The control unit CU controls the movements of the bistable valve Vb by bringing it from the first configuration into the second configuration, and vice versa, thereby determining whether or not to open and close the valve Vb and whether or not to send compressed air to the first control port Vnc1.

The normally open monostable direction-control valve Vna comprises an inlet connected to the source P and an outlet connected to the second control port Vnc2 of the valve Vnc, and can take two operational configurations: a first configuration called open valve, shown in FIGS. 1 and 3, in which the flow of compressed air from the inlet 1.2 to the second control port Vnc2 of the normally closed monostable valve Vnc is allowed, and a second configuration called closed valve, shown in FIGS. 2 and 4, in which the flow of compressed air to the second control port Vnc2 of the normally closed monostable valve Vnc is not allowed. When the valve Vna is open, its inlet and outlet are pneumatically connected, and vice versa, when the Vna valve is closed, its inlet and outlet are pneumatically disconnected.

Preferably, the normally open monostable directional-control valve Vna is a one-way valve, but it can also be a two-way valve. The normally open monostable directional-control valve Vna can be pneumatic, i.e., able to be driven by compressed air, but preferably it is an electrically-driven solenoid valve subjected to an electronic control unit of the programmable type, as will be explained below. The control unit CU controls the movements of the normally open monostable directional-control valve Vna by bringing it from the first configuration into the second configuration, and vice versa, thereby causing the normally open monostable directional-control valve Vna to be opened or closed.

In the example shown, the normally open monostable directional-control valve Vna is equipped with its own spring element 4, preferably a spring, arranged to constantly exert a thrust on the valve Vna that brings it into an open configuration.

The switch of the normally closed monostable valve Vnc from the open valve configuration to the closed valve configuration, and vice versa, is determined by the configurations selectively taken by the valves Vb and Vna at a given instant, and, in the example shown in the figures, also by the action of the spring 3.

FIG. 1 shows the control device 1 in an first activation configuration of the pneumatic element Ve or gripping configuration of the workpiece O, in which compressed air comes out of the outlet 1.3 and supplies the circuit 2 and the pneumatic element Ve, whose depressurization allows the workpiece O to be gripped, as shown, allowing it to be picked up and handled by a manipulator equipped with the pneumatic element Ve. The air pressure in the duct 2.1 served by the control device 1 is equal to the air pressure supplied by the compressed air source, that is, the pressure at 2.1 is equal to the pressure at 1.2.

The control ports Vnc1 and Vnc2 of the normally closed monostable valve Vnc are now used to control the opening of the normally closed monostable valve Vnc, and thus to bring the valve Vnc into its open valve configuration, when:

the bistable valve Vb is in its closed valve configuration, and any compressed air in the valve Vb is vented to the atmosphere through the respective, preferably silenced, nozzle S, and the normally open monostable directional-control valve Vna is in the open valve configuration, as shown in FIG. 1, and air flows from the inlet 1.2 to the second control port Vnc2.

FIG. 2 shows the control device 1 in a second energy-saving configuration, in which the workpiece O remains gripped by the pneumatic element Ve although the latter is no longer supplied with compressed air: compressed air does not leave the outlet 1.3 and does not supply the circuit 2 and pneumatic element Ve, the latter exploiting the low pressure state created earlier during the depressurization shown in FIG. 1 to remain clung to the workpiece O, as shown. The air pressure in the duct 2.1 is equal to the atmospheric pressure and the check valve C helps to maintain the low pressure state in the pneumatic element Ve. Therefore, the workpiece O can be handled by the manipulator. Thus, in this configuration, the grip on the previously picked-up workpiece O is maintained, while avoiding waste of compressed air, which is not supplied to the circuit 2. Compressed air does not flow through the closed bistable valve Vb and does not reach the first control port Vnc1 of the normally closed monostable valve Vnc; any excess pressure that may be present is reduced by discharging air into the atmosphere through the preferably silenced nozzle S. The thrust exerted by the spring 3 on the normally closed monostable valve Vnc is not countered, with the result that the valve Vnc is brought into and remains in the closed-valve configuration, thereby cutting off the supply of compressed air to the circuit 2. The normally open monostable directional-control valve Vna is closed; any pressurized air that may be present is vented to atmosphere through the respective, preferably silenced, nozzle S. The pneumatic element Ve remains depressurized if the circuit 2 and the pneumatic element Ve itself prevent air from entering the circuit 2 or between the pneumatic element Ve and the workpiece O. In practical applications, some pressurization is allowable, as long as the pressurization rate of the pneumatic element Ve is compatible with the time required for the workpiece O to be handled, as provided by the the air pressure in the duct 2.1 is equal to atmospheric pressure. The fourth configuration is similar to the third configuration described with reference to FIG. 3, except that the normally open monostable directional-control valve Vna is closed: compressed air does not flow to the second control port Vnc2 of the normally closed monostable valve Vnc and, therefore, the thrust exerted by the spring 3 and compressed air supplied by the bistable valve Vb to the first control port Vnc1 of the normally closed monostable valve Vnc keeps the normally closed monostable valve Vnc closed.

Table 1 below summarizes the description of the operation of the control device 1. During normal operation, that is in the absence of electrical black-outs, the control device 1 can take one of the four configurations described above.

TABLE 1

| config. | normal operation | | | | electrical black-out | | | |
|---|---|---|---|---|---|---|---|---|
| | Vb | Vna | Vnc | pressure at 2.1 | Vb | Vna | Vnc | pressure at 2.1 |
| 1 workpiece gripping | closed | open | open | equal to the pressure of the source P | closed | open | open | equal to the pressure of the source P |
| 2 energy saving | closed | closed | closed | equal to atmospheric pressure | closed | open | open | equal to the pressure of the source P |
| 3 piece releasing | open | open | closed | equal to atmospheric pressure | open | open | closed | equal to atmospheric pressure |
| 4 piece releasing | open | closed | closed | equal to atmospheric pressure | open | open | closed | equal to atmospheric pressure | production process. In any case, the value of the pressure in the circuit 2 and/or in the pneumatic element can be measured with a special sensor, and the electronic control unit can automatically return the control device 1 to the first activation/workpiece-gripping configuration when the measured pressure value exceeds a threshold value, based on feedback in relation to the sensor readings.

FIG. 3 shows the control device 1 in a third configuration of deactivation of the pneumatic element Ve or workpiece release, in which the workpiece O is voluntarily released from the pneumatic element Ve. In this configuration, the control device 1 is pneumatically decoupled from the circuit 2 and the pneumatic element Ve; the air pressure in the duct 2.1 is equal to atmospheric pressure. The bistable valve Vb is open and compressed air flows through the valve Vb and reaches the first control port Vnc1 of the normally closed monostable valve Vnc, thus helping, together with the spring 3, to close the normally closed monostable valve Vnc and keep it closed. Since the bistable valve Vb is open, the position taken by the normally open monostable directional-control valve Vna makes no difference. In the third configuration, the normally open monostable directional-control valve Vna is open: compressed air flows to the second control port Vnc2 of the normally closed monostable valve Vnc, however, this is not sufficient to counter the thrust exerted by both the spring 3 and compressed air supplied by the bistable valve Vb to the first control port Vnc1 of the normally closed monostable valve Vnc, with the result that the normally closed monostable valve Vnc remains closed.

FIG. 4 shows the control device 1 in a fourth configuration of workpiece release, in which the workpiece O is voluntarily released from the pneumatic element Ve. In this configuration, the control device 1 is pneumatically decoupled from the circuit 2 and the pneumatic element Ve;

In case of power failure, the control device 1 can take four stable configurations only, one for each of the previously described four configurations, which ensure that the workpiece O is not accidentally released:

in the first activation/workpiece-gripping configuration, the position of the valves Vb, Vna, and Vnc does not change, since the spring 4 keeps the valve Vna in the open position, which is the at rest position for this valve;

in the second energy-saving configuration, the valves Vna and Vnc open up, since the spring 4 brings the valve Vna into the open position, which is the at rest position for this valve, thus causing the Vnc valve to open up;

in the third configuration of deactivating the pneumatic element Ve or releasing the workpiece, the position of the valves Vb, Vna and Vnc remains unchanged, since the workpiece O has already been voluntarily released;

in the fourth configuration of releasing the workpiece, the position of the valves Vb, Vna and Vnc remains unchanged, since the workpiece O has already been voluntarily released.

Thus, it is understood that the control device 1 according to the present invention implements both energy saving and safeguard/safety against power failures, while always ensuring that the workpiece O is effectively retained. Compared with solutions such as the one described in EP3867024, which involve the use of two solenoid valves D1, D2 arranged in series in the compressed air supply circuit, upstream of the normally closed monostable valve Vnc, the control device 1 provides a solution with valves or solenoid valves arranged in parallel, which solution allows a shorter circuit 1.1 to be adopted and allows greater responsiveness of the device 1. Indeed, the valves Vna and Vb are arranged in parallel in the compressed air circuit 1.1 and are pneumatically inserted between the source P and the valve Vnc.

As shown in the figures with the CU reference, the control device 1 preferably comprises an electronic control unit integrated therein. The control unit CU can be programmed to control the solenoid valves Vb and Vna according to specific programs, depending on the application, and, as mentioned above, preferably by feedback based on the air pressure value detected by a sensor (not shown) inserted into 2.1, or into the circuit 2, or into the pneumatic element Ve. This arrangement allows the switch from the second configuration to the first configuration to be controlled, when there is a risk of accidentally losing the workpiece O due to the pressure in the pneumatic element exceeding a threshold value, and vice versa, allows the switch from the first configuration to the second configuration to be controlled in order to save compressed air, repeatedly and alternately in time, for as long as it takes to handle the workpiece O until it is released, when the control unit CU controls the switch to the third or fourth configuration.

Due to the presence of the control unit CU, the control device 1 is automatic, i.e. it operates automatically, based on the program that is set individually each time.

FIGS. 5-8 are construction diagrams of a second embodiment 1' of a control device according to the present invention, in which in FIGS. 1-4 the same reference numbers denote the same components or components equivalent thereto. The second embodiment 1' is similar to the embodiment 1, except that:

the bistable valve Vb is a pneumatic valve not countered by a spring, and comprises a first control port Vb1 and a second control port Vb2 (pneumatic ports), and two additional valves are inserted into the circuit 1.1, a first monostable valve Vm1 functionally interposed between the source P of compressed air and the first control port Vb1 of the bistable valve Vb, and a second monostable valve Vm2 functionally interposed between the source P of compressed air and the second control port Vb2 of the bistable valve Vb.

Preferably, the bistable valve Vb is a one-way valve, but it can also be a two-way valve.

Preferably, the valves Vm1 and Vm2 are solenoid valves countered by respective spring elements (springs) 5 and 6 and equipped with nozzles S for venting compressed air to atmosphere.

Preferably, there is also the filter F1, even if it is not shown for the sake of simplicity.

Thanks to this configuration, the position of the bistable valve Vb can be pneumatically controlled, meaning that the bistable valve Vb can be configured selectively to be opened or closed based on the configuration taken at that moment by the two monostable valves Vm1 and Vm2, which must never be both open and can be both closed, or one can be open and the other closed.

Figure 5:
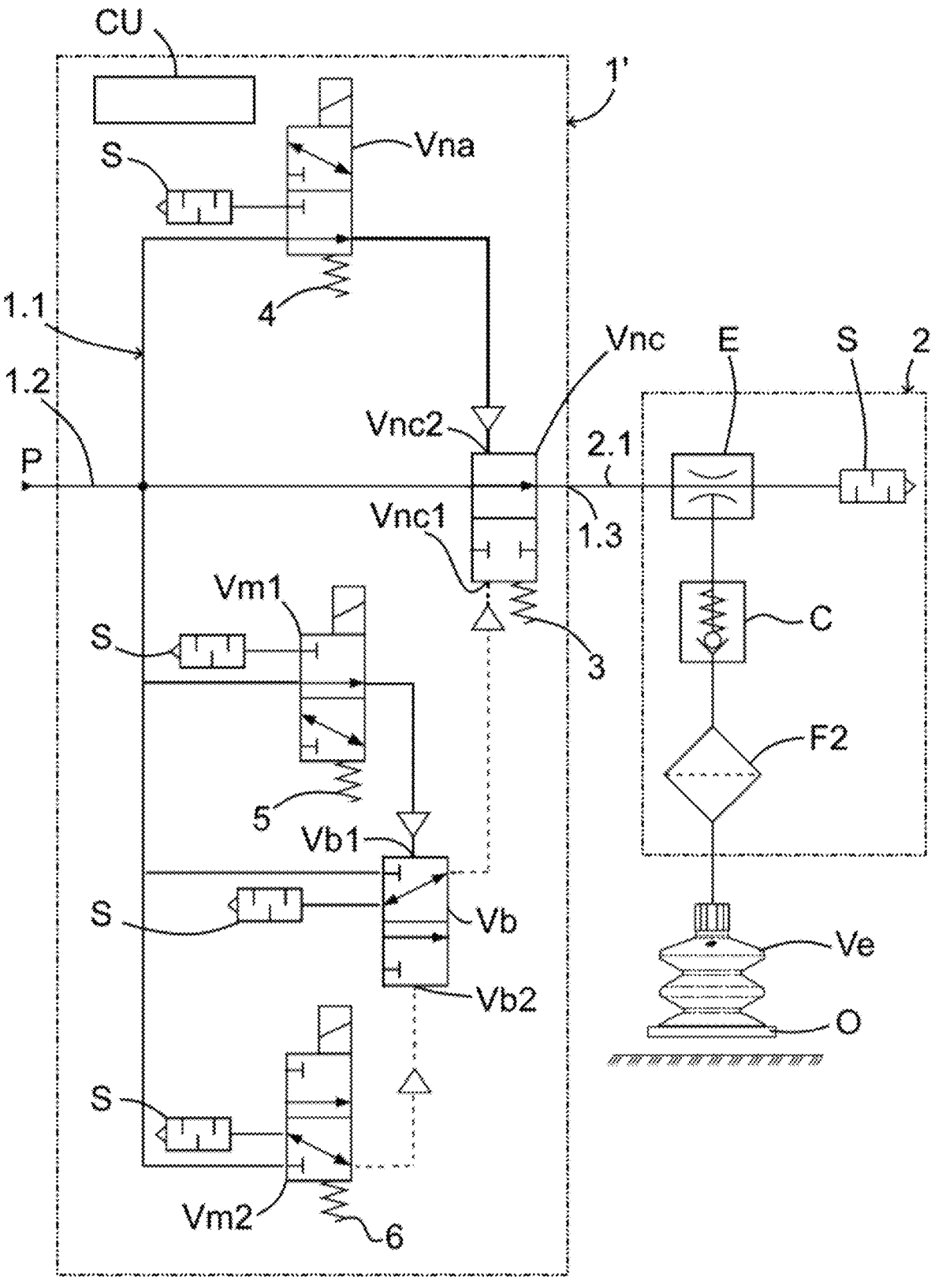
FIGS. 5-8 are schematic views of a second embodiment of a control device according to the present invention, adapted to control a pneumatic element and shown in corresponding configurations of use.

FIG. 5 shows the control device 1' in a first activation configuration/gripping configuration of the workpiece O, in which the device 1' has to be coupled to the circuit 2 pneumatically. Compressed air comes out of the outlet 1.3 and supplies the circuit 2 and the pneumatic element Ve, whose depressurization allows the workpiece O to be gripped, as shown; the workpiece O can be picked up and handled by a manipulator equipped with the pneumatic element Ve. The air pressure in the duct 2.1 served by the control device 1 is equal to the air pressure supplied by the compressed air source, that is, the pressure at 2.1 is equal to the pressure at 1.2.

The control ports Vnc1 and Vnc2 of the normally closed monostable valve Vnc are now used to control the opening of the normally closed monostable valve Vnc, and thus to bring and keep the valve Vnc into its open valve configuration. To obtain this:

the bistable valve Vb is in its closed valve configuration, the normally open monostable directional-control valve Vna is in the open valve configuration, as shown in FIG. 5, and air flows from the inlet 1.2 to the second control port Vnc2 of the valve Vnc. This is sufficient to overcome the thrust exerted by the spring 3.

To close and keep the valve Vb closed, the first monostable valve Vm1 is kept open (by the actuator, since it is a solenoid valve) by countering the spring 5, and the second monostable valve Vm2 is kept closed, under the action of the spring 6. In practice, therefore, the compressed air does not reach the first control port Vnc1 of the normally closed monostable valve Vnc, with the result that the compressed air that, coming from the normally open monostable directional-control valve Vna, reaches the second control port Vnc2, counters the spring 3 and keeps the valve Vnc open.

Figure 6:
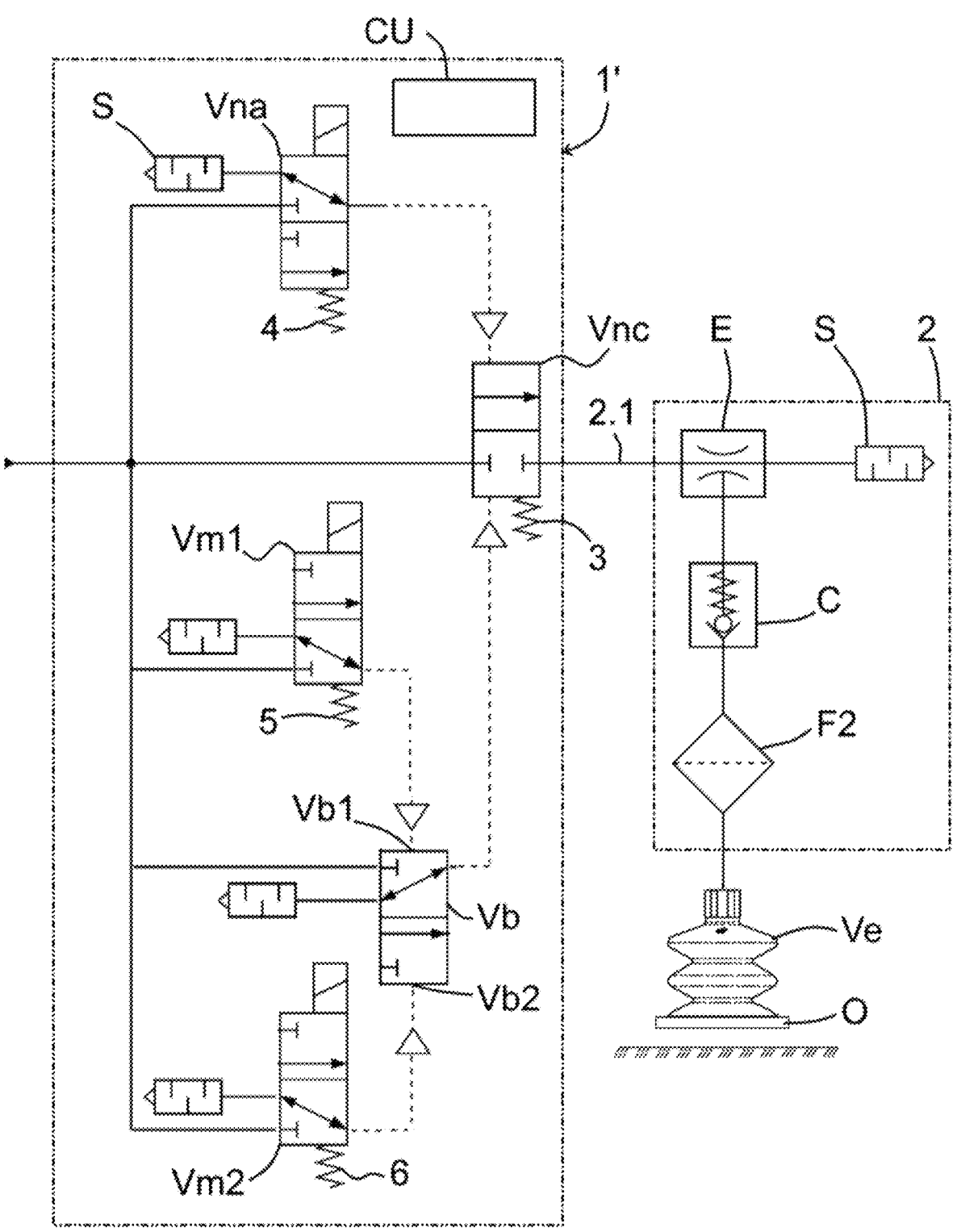

FIG. 6 shows the control device 1' in the second energy-saving configuration, in which the workpiece O remains gripped by the pneumatic element Ve although the latter is no longer supplied by compressed air: compressed air does not leave the outlet 1.3 and does not supply the circuit 2 and pneumatic element Ve, the latter exploiting the low pressure state created earlier during the depressurization shown in FIG. 5 to remains clung to the workpiece O, as shown. The air pressure in the duct 2.1 is equal to the atmospheric pressure and the check valve C helps to maintain the low pressure state in the pneumatic element Ve. Therefore, the workpiece O can be handled by the manipulator. Thus, in this configuration, the grip on the previously picked-up workpiece O is maintained, while avoiding waste of compressed air, which is not supplied to the circuit 2. The compressed air does not flow through the closed bistable valve Vb and does not reach the first control port Vnc1 of the normally closed monostable valve Vnc. The thrust exerted by the spring 3 on the normally closed monostable valve Vnc is not countered, with the result that the valve Vnc is brought into and remains in the closed-valve configuration, thereby cutting off the supply of compressed air to the circuit 2. The normally open monostable directional-control valve Vna is closed. The two monostable valves Vm1 and Vm2 remain closed.

The pneumatic element Ve remains depressurized if the circuit 2 and the pneumatic element Ve itself prevent air from entering the circuit 2 or between the pneumatic element Ve and the workpiece O. In practical applications, some pressurization is allowable, as long as the pressurization rate of the pneumatic element Ve is compatible with the time required for the workpiece O to be handled, as provided by the production process. In any case, the pressure value in the circuit 2 and/or in the pneumatic element can be measured with a special sensor, and the electronic control unit CU can automatically return the control device 1 to the first configuration of activating the pneumatic element Ve or gripping the workpiece O, when the measured pressure value exceeds a threshold value, based on feedback in relation to the sensor readings.

In the event of an electrical black-out, the normally open monostable directional-control valve Vna returns to an open position, as shown in FIG. 5, thus allowing air flow to the second control port Vnc2 of the valve Vnc, thereby restoring the first configuration of the device 1' shown precisely in FIG. 5, so as to ensure that the workpiece O is not accidentally released.

Figure 7:
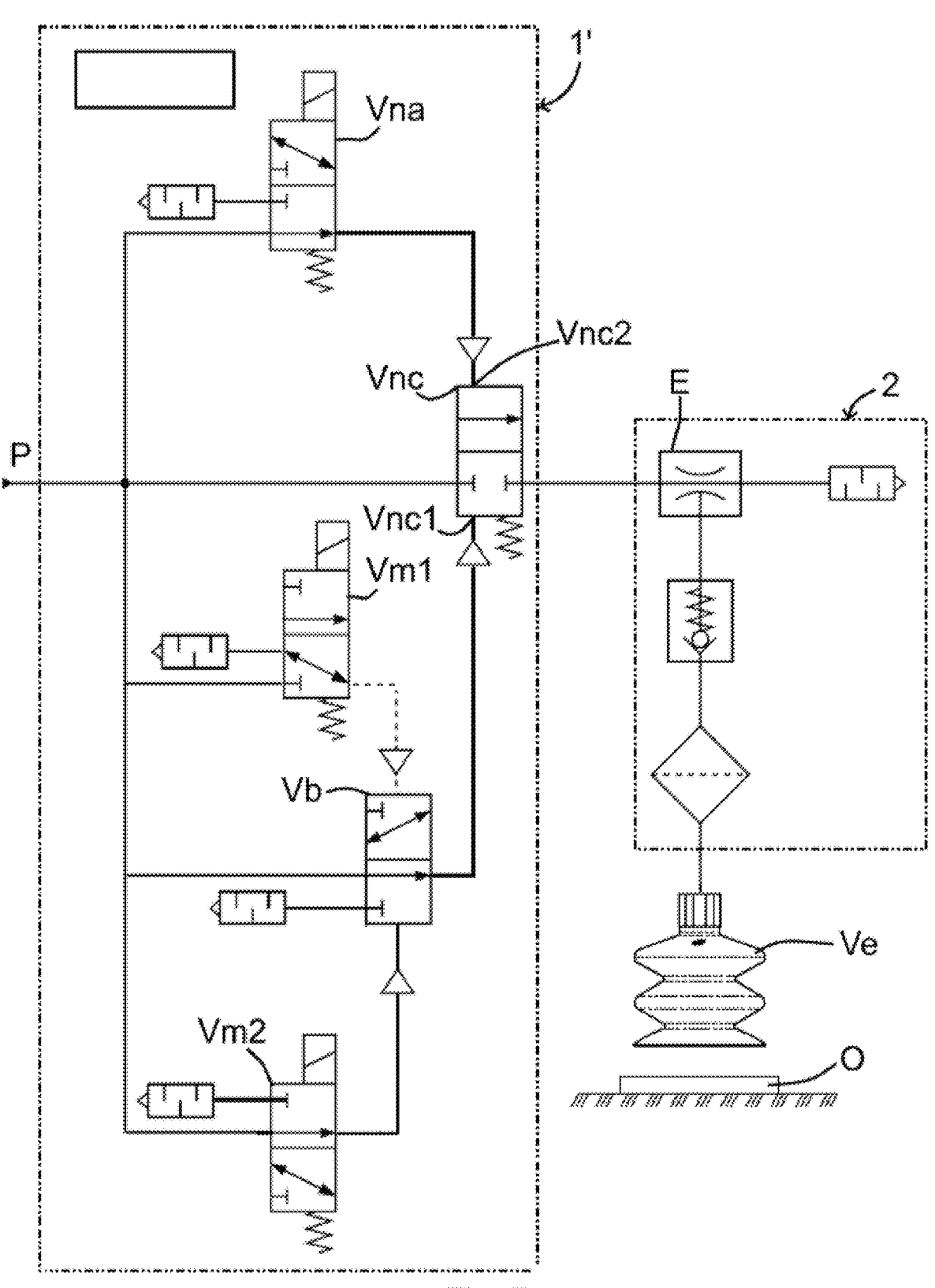

FIG. 7 shows the control device 1' in a third configuration of deactivation of the pneumatic element Ve or workpiece release, in which the workpiece O is voluntarily released from the pneumatic element Ve. In this configuration, the control device 1' is pneumatically decoupled from the circuit 2 and the pneumatic element Ve; the air pressure in the duct 2.1 is equal to atmospheric pressure. Since the valve Vm2 is open and the valve Vm1 is closed, the bistable valve Vb is open and compressed air flows through the valve Vb and reaches the first control port Vnc1 of the normally closed monostable valve Vnc, thus helping, together with the spring 3, to close the normally closed monostable valve Vnc and keep it closed. Since the bistable valve Vb is open, the position taken by the normally open monostable directional-control valve Vna makes no difference. In this third configuration, the normally open monostable directional-control valve Vna is open: compressed air flows to the second control port Vnc2 of the normally closed monostable valve Vnc, however, this is not sufficient to counter the thrust exerted by both the spring 3 and compressed air supplied by the bistable valve Vb to the first control port Vnc1 of the normally closed monostable valve Vnc, with the result that the normally closed monostable valve Vnc remains closed.

Figure 8:
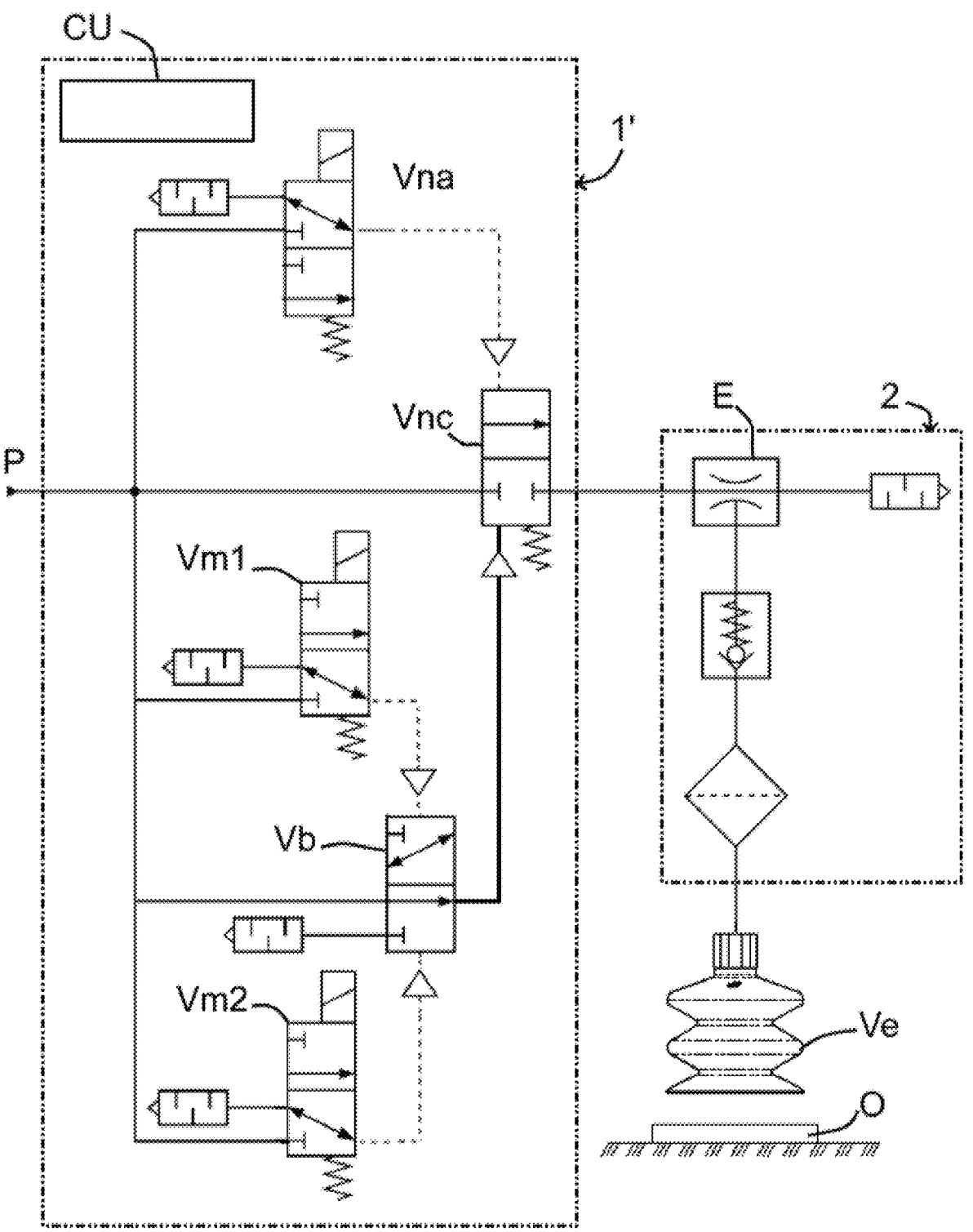

FIG. 8 shows the control device 1' in a fourth configuration of workpiece release, in which the workpiece O is voluntarily released from the pneumatic element Ve. In this configuration, the control device 1' is pneumatically decoupled from the circuit 2 and the pneumatic element Ve; the air pressure in the duct 2.1 is equal to atmospheric pressure. The fourth configuration is similar to the third configuration described with reference to FIG. 7, except that the normally open monostable directional-control valve Vna is closed and the valves Vm1 and Vm2 are both closed: compressed air does not flow to the second control port Vnc2 of the normally closed monostable valve Vnc and, therefore, the thrust exerted by the spring 3 and compressed air supplied by the bistable valve Vb to the first control port Vnc1 of the normally closed monostable valve Vnc keeps the valve Vnc closed.

Table 2 below summarizes the description of the operation of the control device 1'. During normal operation, that is, in the absence of electrical black-outs, the control device 1' can take one of the four configurations described above.

In the event of power failure, the control device 1' can take four stable configurations only, one for each of the previously described four configurations, which ensure that the workpiece O is not accidentally released:

in the first activation/workpiece gripping configuration, the position of valves Vb, Vna, and Vnc does not change, since the spring 4 keeps the valve Vna in the open position, which is the at rest position for this valve. The valve Vm1 is brought into the closed position by the spring 5, but this does not change the configuration of the valve Vb, which remains closed;

in the second energy-saving configuration, the valve Vna opens up due to the spring 4 and controls the opening of the valve Vnc. The valves Vm1 and Vm2 remain closed due to their respective springs 5 and 6;

in the third configuration of deactivating the pneumatic element Ve or releasing the workpiece, the position of the valves Vb, Vna and Vnc remains unchanged, since the workpiece O has already been voluntarily released. The valve Vm1 remains closed and the valve Vm2 is brought to closing, pushed by the respective spring 6;

in the fourth configuration of releasing the workpiece, the position of the valves Vb and Vnc remains unchanged, since the workpiece O has already been voluntarily released. The valves Vm1 and Vm2 remain closed due to their respective springs 5 and 6. Vna is brought to opening, pushed by the corresponding spring.

Thus, it is understood that the control device 1' according to the present invention implements both energy saving and safeguard/safety against power failures, while always ensuring that the workpiece O is effectively retained, with the same advantages described above in relation to the first embodiment 1.

The control unit CU, also in the device 1', is electronic and integrated therein, and can be programmed to control all the valves of the device 1' based on specific programs and based on the application, preferably by feedback based on the air pressure value detected by a sensor (not shown) inserted into 2.1, or into the circuit 2, or into the pneumatic element Ve.

Due to the presence of the control unit CU, the control device 1 is also automatic, i.e. it operates automatically, based on the program that is set individually each time.

The invention claimed is:

1. A control device (1, 1') to control a pneumatic element (Ve, E, 2), the control device (1, 1') comprising a supply

TABLE 2

| config. | normal operation | | | | | | electrical black-out | | | | | |
|---|---|---|---|---|---|---|---|---|---|---|---|---|
| | Vb | Vna | Vnc | Vm1 | Vm2 | pressure at 2.1 | Vb | Vna | Vnc | Vm1 | Vm2 | pressure at 2.1 |
| 1 workpiece gripping | c | a | a | a | c | equal to the pressure of the source P | c | a | a | c | c | equal to the pressure of the source P |
| 2 energy saving | c | c | c | c | c | equal to atmospheric pressure | c | a | a | c | c | equal to the pressure of the source P |
| 3 Piece releasing | a | a | c | c | a | equal to atmospheric pressure | a | a | c | c | c | equal to atmospheric pressure |
| 4 piece releasing | a | c | c | c | c | equal to atmospheric pressure | a | a | c | c | c | equal to atmospheric pressure | a = open;
c = closed.

circuit (1.1) supplying compressed air for connecting to an inlet (2.1) of the pneumatic element (Ve, E, 2) and, in the supply circuit (1.1):

a normally closed monostable valve (Vnc) having an inlet for connecting to a compressed air source (P) and an outlet for connecting to the inlet (2.1) of the pneumatic element (Ve, E, 2), and having a first control port (Vnc1) and a second control port (Vnc2), a bistable valve (Vb) having an inlet connected to said compressed air source (P) and an outlet connected to said first control port (Vnc1) of the normally closed monostable valve (Vnc), said first control port (Vnc1) being configured to control the closing of the normally closed monostable valve (Vnc), a normally open monostable valve (Vna) having a first inlet connected to said compressed air source (P) and an outlet connected to said second control port (Vnc2) of the normally closed monostable valve (Vnc), said second control port (Vnc2) being configured to control the opening of the normally closed monostable valve (Vnc), wherein the bistable valve (Vb) is able to take an open configuration to allow the compressed air to pass through, in which the inlet and the outlet of the same bistable valve (Vb) are connected, and a closed configuration to stop the compressed air from passing through, in which the inlet and the outlet of the same bistable valve (Vb) are disconnected and the outlet is connected to a nozzle(S) for venting the compressed air to atmosphere, and wherein the normally open monostable valve (Vna) is able to take an open configuration, in which the inlet and outlet of the same normally open monostable valve (Vna) are connected, and a closed configuration, in which the inlet and outlet of the same normally open monostable valve (Vna) are disconnected and the outlet is connected to the nozzle(S) for venting the compressed air to atmosphere.

2. The control device (1, 1') according to claim 1, wherein the open configuration of the normally open monostable valve (Vna) is an at rest configuration.

3. The control device (1, 1') according to claim 1, wherein the normally open monostable valve (Vna) comprises a spring element (4) configured to constantly exert a thrust on the normally open monostable valve (Vna) in the direction that brings the normally open monostable valve (Vna) into the open configuration.

4. The control device (1, 1') according to claim 1, in which the closed configuration of the normally closed monostable valve (Vnc) is an at rest configuration.

5. The control device (1, 1') according to claim 4, wherein the normally closed monostable valve (Vnc) is a pneumatic valve.

6. The control device (1, 1') according to claim 1, wherein the normally closed monostable valve (Vnc) comprises a spring element (3) configured to constantly exert a thrust on the normally closed monostable valve (Vnc) in the direction that brings the normally closed monostable valve (Vnc) into the closed configuration.

7. The control device (1, 1') according to claim 1, wherein the bistable valve (Vb) and the normally open monostable valve (Vna) are arranged in parallel in the supply circuit (1.1) and are pneumatically inserted between the compressed air source (P) and the normally closed monostable valve (Vnc).

8. The control device (1, 1') according to claim 1, wherein in a first configuration of the control device (1), the bistable valve (Vb) is closed, the normally open monostable valve (Vna) is open, and the normally closed monostable valve (Vnc) is open.

9. The control device (1, 1') according to claim 8, wherein in a second configuration of the control device (1), the bistable valve (Vb) is closed, the normally open monostable valve (Vna) is closed, and the normally closed monostable valve (Vnc) is closed.

10. The control device (1, 1') according to claim 9, wherein in a third configuration of the control device (1), the bistable valve (Vb) is open, the normally open monostable valve (Vna) is open, and the normally closed monostable valve (Vnc) is closed.

11. The control device (1, 1') according to claim 10, wherein in a fourth configuration of the control device (1), the bistable valve (Vb) is open, the normally open monostable valve (Vna) is closed, and the normally closed monostable valve (Vnc) is closed.

12. The control device (1, 1') according to claim 1, wherein the normally open monostable valve (Vna) is configured to open automatically in response to an electrical black-out.

13. The control device (1, 1') according to claim 1, wherein the normally open monostable valve (Vna) is a solenoid valve.

14. The control device (1) according to claim 1, wherein the bistable valve (Vb) is a solenoid valve.

15. The control device (1') according to claim 1, wherein the bistable valve (Vb) is a pneumatic valve and the control device (1') comprises a first monostable valve (Vm1) functionally interposed between the compressed air source (P) and a first control port (Vb1) of the bistable valve (Vb), and a second monostable valve (Vm2) functionally interposed between the compressed air source (P) and a second control port (Vb2) of the bistable valve (Vb), and wherein the first control port (Vb1) of the bistable valve (Vb) is configured to control the closing of the bistable valve (Vb), and wherein the second control port (Vb2) of the bistable valve (Vb) is configured to control the opening of the bistable valve (Vb).

16. The control device (1') according to claim 15, wherein the first monostable valve (Vm1) and the second monostable valve (Vm2) are arranged in parallel in the supply circuit (1.1) and are pneumatically inserted between the compressed air source (P) and the bistable valve (Vb).

17. The control device (1') according to claim 15, wherein in a first configuration of the control device (1), the bistable valve (Vb) is closed, the normally open monostable valve (Vna) is open, the normally closed monostable valve (Vnc) is open, the first monostable valve (Vm1) is open and the second monostable valve (Vm2) is closed.

18. The control device (1') according to claim 17, wherein in a second configuration of the control device (1), the bistable valve (Vb) is closed, the normally open monostable valve (Vna) is closed, and the normally closed monostable valve (Vnc) is closed, the first monostable valve (Vm1) is closed and the second monostable valve (Vm2) is closed.

19. The control device (1') according to claim 18, wherein in a third configuration of the control device (1), the bistable valve (Vb) is open, the normally open monostable valve (Vna) is open, and the normally closed monostable valve (Vnc) is closed, the first monostable valve (Vm1) is closed and the second monostable valve (Vm2) is open.

20. The control device (1') according to claim 19, wherein in a fourth configuration of the control device (1), the bistable valve (Vb) is open, the normally open monostable valve (Vna) is closed and the normally closed monostable valve (Vnc) is closed, the first monostable valve (Vm1) is closed and the second monostable valve (Vm2) is closed.

21. The control device (1, 1') according to claim 1, comprising an electronic control unit (CU) programmed to selectively and automatically control each valve (Vnc, Vb, Vna, Vm1, Vm2) based on a program and by feedback based on a signal generated by one or more air pressure sensors which are positioned in the supply circuit (1.1) or in the pneumatic element (2, E, Ve).

* * * * *